United States Patent [19]
Scotti et al.

[11] Patent Number: 5,238,056
[45] Date of Patent: Aug. 24, 1993

[54] HEAT EXCHANGER WITH OSCILLATING FLOW

[75] Inventors: Stephen J. Scotti, Grafton; Max L. Blosser, Newport News; Charles J. Camarda, Virginia Beach, all of Va.

[73] Assignee: The United States of America as represented by the Administrator of the National Aeronautics and Space Administration, Washington, D.C.

[21] Appl. No.: 843,653

[22] Filed: Feb. 24, 1992

Related U.S. Application Data

[62] Division of Ser. No. 501,909, Mar. 30, 1990, Pat. No. 5,107,920.

[51] Int. Cl.$^5$ .............................................. F28F 13/02
[52] U.S. Cl. ................................... 165/109.1; 165/97; 165/104.31; 165/110; 165/903; 165/913
[58] Field of Search ............. 165/109.1, 41, 4, 104.31, 165/104.34, 110, 87, 903, 913

[56] References Cited

U.S. PATENT DOCUMENTS

| | | | |
|---|---|---|---|
| 4,488,592 | 12/1984 | Mittal et al. | 165/104.31 |
| 4,590,993 | 5/1986 | Kurzweg | 165/104.31 |
| 5,107,920 | 4/1992 | Scotti et al. | 165/104.31 |

FOREIGN PATENT DOCUMENTS

| | | | |
|---|---|---|---|
| 187553 | 7/1907 | Fed. Rep. of Germany | 165/104.31 |
| 1033223 | 7/1958 | Fed. Rep. of Germany | 165/104.31 |

Primary Examiner—Albert W. Davis, Jr.
Attorney, Agent, or Firm—Kevin B. Osborne

[57] ABSTRACT

Various heat exchange apparatuses are described in which an oscillating flow of primary coolant is used to dissipate an incident heat flux. The oscillating flow may be imparted by a reciprocating piston, a double action twin reciprocating piston, fluidic oscillators or electromagnetic pumps. The oscillating fluid flows through at least one conduit in either an open loop or a closed loop. A secondary flow of coolant may be used to flow over the outer walls of at least one conduit to remove heat transferred from the primary coolant to the walls of the conduit.

21 Claims, 5 Drawing Sheets

HEAT EXCHANGER WITH OSCILLATING FLOW

ORIGIN OF THE INVENTION

The invention described herein was made by employees of the United States Government and may be manufactured and used by or for the Government for governmental purposes without the payment of any royalties thereon or therefor.

This is a divisional of copending application Ser. No. 07/501,909 filed on Mar. 30, 1990, now U.S. Pat. No. 5,107,920.

BACKGROUND OF THE INVENTION

1. Field of the Invention

The present invention relates generally to heat exchangers and, more specifically, to heat exchangers using an oscillating flow through heat exchange outputs.

2. Description of the Related Art

In a classical "heat pipe", heat is transported by a phase change from liquid to gas at the heated end of the pipe, a transport of the heated vapor down the pipe to cooler regions, a phase change from gas to liquid releasing the heat to the cooled walls, and a capillary pumping of the condensed liquid which returns it to the heated end of the pipe.

The capability of cooling structures to survive extremely large heat fluxes has become increasingly important, particularly with aerospace applications. As an example, the cowl lip of a scramjet engine may be subjected to shock interference heating which can produce heat fluxes with values on the order of 100,000 BTU per square foot per second. Thus, a need exists for an active cooling concept that is capable of handling this extreme heat flux requirement.

A wide variety of heat transfer devices are currently known and used. U.S. Pat. No. 2,581,760, issued to Harpoothian et al., discloses a aircraft deicing system which employs a heated fluid circulating at high velocity close to the external skin of the aircraft.

German Patent 1,033,223 discloses a press to fabricate matrices and printing plates from plastics. In the process, heating and cooling are required to make the plates. In one aspect of the disclosure, the liquid within ducts is either transferable in an oscillatory fashion or can be pumped in one direction. However, the structure described as having a possible oscillatory flow is not a heat exchanger in which heat transfer is enhanced. Instead, the fluid is used to better distribute the heat input from electric heaters embedded inside the fluid passages. The oscillatory movement is described to be slow so that the plate is heated on the bottom and then the heated fluid is transferred to top plate by a pump to be used to heat the top plate while the bottom plate starts a cooling cycle using a separate cool fluid.

U.S. Pat. No. 2,941,759 discloses an aeronautical heat exchanger which cools leading edges of airfoils or other surfaces heated by air friction by transpiring a coolant such as water through a course outer wall.

U.S. Pat. No. 4,257,556, issued to Skala, discloses a heat transfer system which can supply heat by liquid convection from a hot reservoir to a number of intermittent users. A thermally degradable fluid is typically used in portions of the system and the time at temperatures which cause degradation is minimized. A liquid metal may be pumped by an electromagnetic pump, although the pumping does not create an oscillating flow.

U.S. Pat. No. 3,265,122 generally discloses an oscillating fluid in a heat exchanger.

U.S. Pat. No. 4,488,592, issued to Mittal et al., discloses an oscillating pump which circulates coolant through a large scale integrated circuit. The volume of chambers of the pump are sufficient to move a volume of coolant fluid sequentially through one of two heat exchangers and the large scale integrated circuit. Thus, the pump merely represents a "reverse flow" system in which fluid circulates back and forth through a structure to be cooled. U.S. Pat. No. 4,590,993, issued to Kurzwig, describes a heat transfer device which attempts to transport large heat flux without net mass transfer. An oscillating flow is described to occur between one reservoir and another. Basically, heat is transported from a hot reservoir to a cool one with no net flow of heat through the side walls.

SUMMARY OF THE INVENTION

An object of the present invention is to provide a heat exchanger capable of cooling structures to survive extremely large heat fluxes.

Another object of the present invention is to provide a heat exchanger capable of ice-free heat removal of a gas in a plenum, or liquifaction of a condensable gas in a plenum.

Another object of the present invention is to provide a heat exchanger capable of removing heat incident upon a sidewall or from within a plenum.

These and other objects of the invention are met by providing a heat exchange apparatus which includes at least one conduit exposed to an incident heat flux and providing a primary coolant channel for a primary coolant, means for imparting an oscillatory flow of primary coolant in the at least one conduit, and means for flowing a secondary coolant over an outer surface of the at least one conduit.

Preferably, the means for imparting an oscillatory flow includes either a single action or double action reciprocating positive displacement pump.

In another aspect of the present invention, a heat exchanger apparatus includes at least one conduit having first and second ends and providing a channel for a gas, means connected to the first end of the at least one conduit of imparting an oscillating flow of gas in the at least one conduit, and a volume of gas from which heat is removed contained in a plenum connected to the second end of the at least one conduit. The heat transferred from the plenum to the conduits is removed by a coolant flow over an outer surface of the at least one conduit.

In another aspect of the present invention, a heat exchange apparatus includes at least one conduit having first and second ends and being exposed to an incident heat flux and providing a primary coolant channel for a primary coolant, means connected to the first end of the at least one conduit for imparting an oscillating flow of primary coolant in the at least one conduit, and coolant removal means connected to the second end for removing primary coolant during one half cycle of oscillation and introducing primary coolant during another half cycle.

Preferably, a primary coolant supply line is included so that the coolant removal means includes a chamber disposed in the primary coolant supply line and a pair of valves including an intake valve and an exhaust valve timed for sequential actuation to coincide with the half cycles of oscillation of the primary coolant.

In another aspect of the present invention, an oscillatory flow of primary coolant is created by a pump which provides a pressure head. The oscillating flow is created by switching valves in a network of channels so as to direct the flow of primary coolant back and forth through at least one conduit.

These and other features and advantages of the heat exchange apparatus of the present invention will become more apparent with reference to the following detailed description and drawings.

DETAILED DESCRIPTION OF THE PREFERRED EMBODIMENTS

According to the present invention, a heat exchange apparatus is used to efficiently transport heat from the heated portions to a cooler portion. Although the basic concept achieves very high effective thermal conductivity simulat to the classical heat pipe a heat pipe transports heat by a phase change from liquid to gas at the heated end of the pipe, a transport of the heated vapor down the pipe to the cooler regions, a phase change from gas to liquid releasing the heat to the cooled walls a capillary pumping of the condensed liquid which returns it to the heated end of the pipe. According to the present invention, however, the heat is transported from the heated portions of the device consisting of channels, tubes, or coolant passages of standard geometries by oscillating fluid through the passages. As a result, there is no time-average flow in the tubes. Thus, the heat is either removed from the end reservoirs on every cycle or is removed indirectly by cooling the side of the channels with another coolant.

Figure 1:
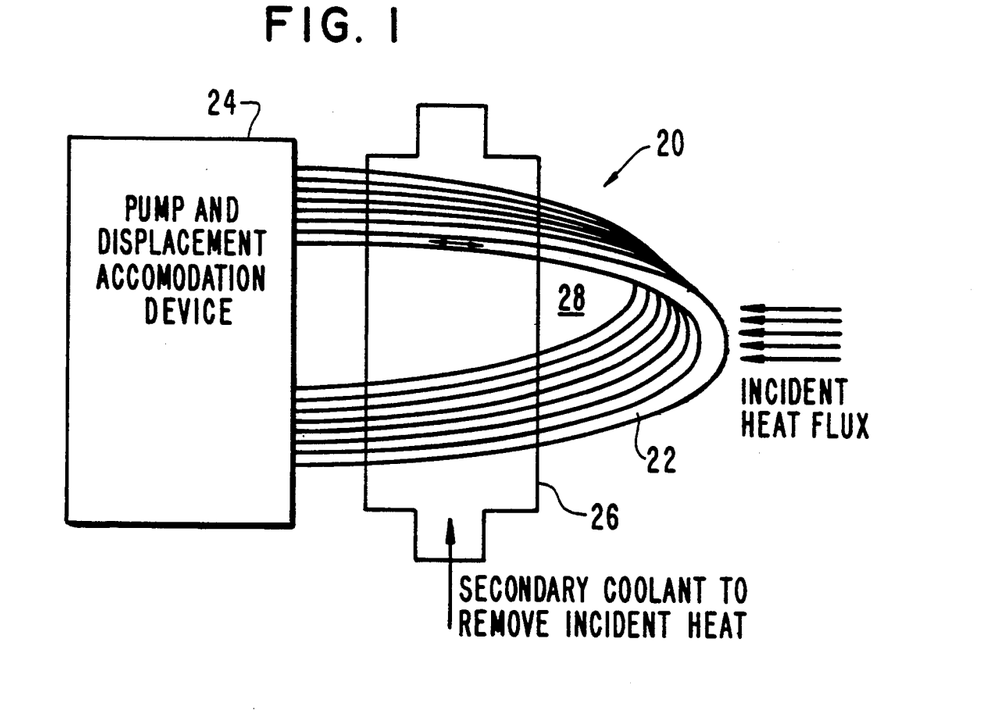
FIG. 1 is a schematic view of a first, preferred embodiment of the present invention.

Various aspects of the invention will be described with reference to the figures. In FIG. 1, a heat exchange apparatus is generally referred to by the numeral 20. At least one conduit 22 is exposed to an incident heat flux and provides a primary coolant channel for a primary coolant moving inside the conduit. In FIG. 1, a plurality of conduit 22 are disposed side-by-side and are bent to a shape substantially corresponding to that of an aerodynamic structure, such as the cowl lip of a scramjet engine. The incident heat flux impinges upon the tubes 22 near the apex thereof.

A pump and displacement accommodating device 24 provides means for imparting an oscillatory flow of primary coolant in the conduits 22 as shown by the bi-directional arrows. The device 24 is coupled to the ends of the conduits 22. A device 26 provides means for flowing a secondary coolant over an outer surface of the conduits 22. The device 26 is schematically represented as a structure which permits the introduction of secondary coolant into contact with the conduits 22 to remove incident heat. The device 26 may simply be the interior space 28 formed by the plurality of conduits 22, wherein a coolant flows through the space 28 to remove the incident heat. Alternatively, the device 26 may be manifold or other structure which envelopes the conduits to provide a flow channel of secondary coolant.

Figure 3A:
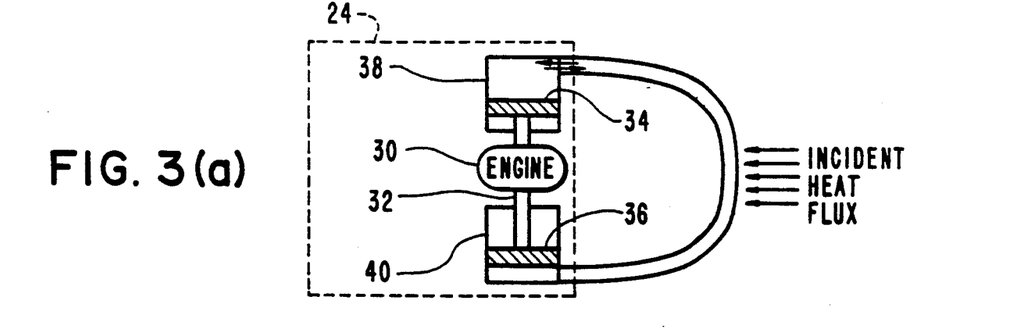
FIG. 3a is a schematic view of a first, preferred embodiment of a pump used in various embodiments of the heat exchange apparatus according to the present invention.

Referring to FIG. 3A, the pump and displacement accommodating device 24 is a dual positive displacement pump which includes an engine 30 which imparts reciprocating movement in a shaft 32. The engine may be an internal combustion engine or an electric motor, for example. First and second pistons 34 and 36 are coupled to the shaft 32 for reciprocating movement in corresponding chambers 38 and 40, respectively. Due to the fact that the pistons 34 and 36 are mounted on a common shaft 32, one piston operates in a compression stroke while the other piston is operating in a vacuum stroke.

Figure 3B:
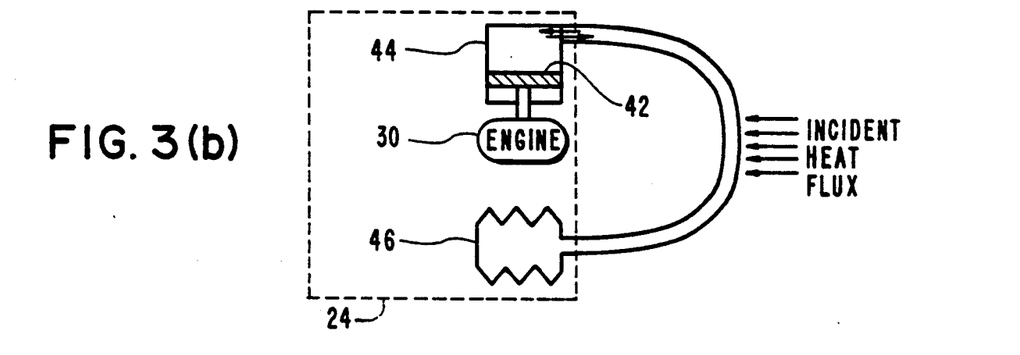
FIG. 3b is a schematic view of a second, preferred embodiment of a pump used in various embodiments of the heat exchange apparatus according to the present invention.

In the embodiment of FIG. 3(b), the engine 30 reciprocates a single piston 42 in a chamber 44. Displacement of the pump is accomodated in a device such as a diaphragm or bellows 46 which expands and contracts as a result of reciprocation of the piston 42.

Figure 4A:
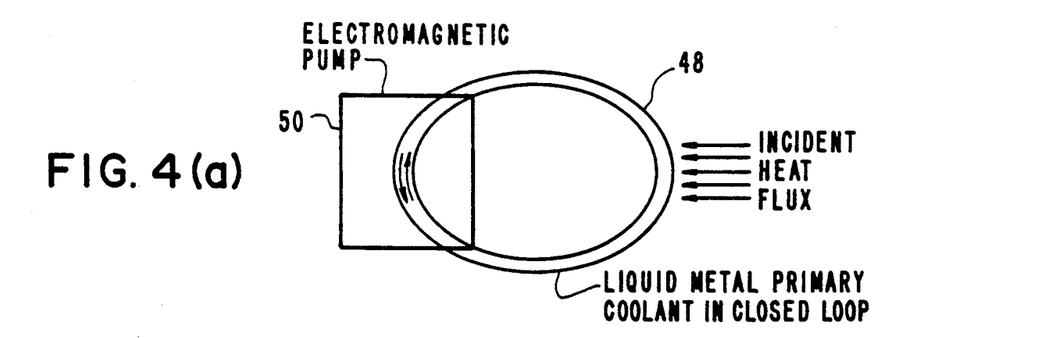
FIG. 4a is a schematic view of another embodiment of a heat exchange apparatus according to the present invention, and employing an electromagnetic pump.

In the embodiment illustrated in FIG. 4(a), the conduit 48 is a closed loop which carries a liquid metal or ferro liquid primary coolant. An electromagnetic pump 50 is used to be generate the oscillatory flow of coolant in the conduit 48.

Figure 4B:
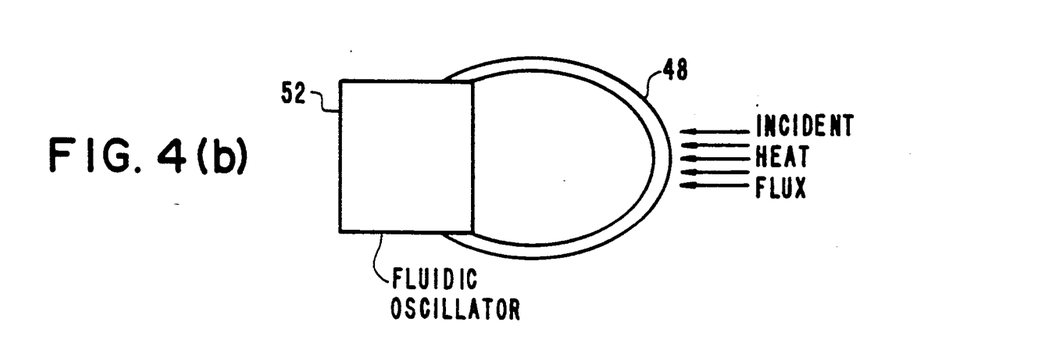
FIG. 4b is a schematic view of a heat exchange apparatus according to the present invention, and employing a fluidic oscillator.

In the embodiment of FIG. 4(b), the electromagnetic pump is replaced by a fluidic oscillator 52 and the coolant need not be a liquid metal. Both the fluidic oscillator and the electromagnetic pump are known and commercially available. In both of these embodiments, both ends of the coolant passages are shown as ending in the pumping device. However, this is not a necessity since any type of displacement accommodating device can be used at one end of the coolant passage.

Figure 2:
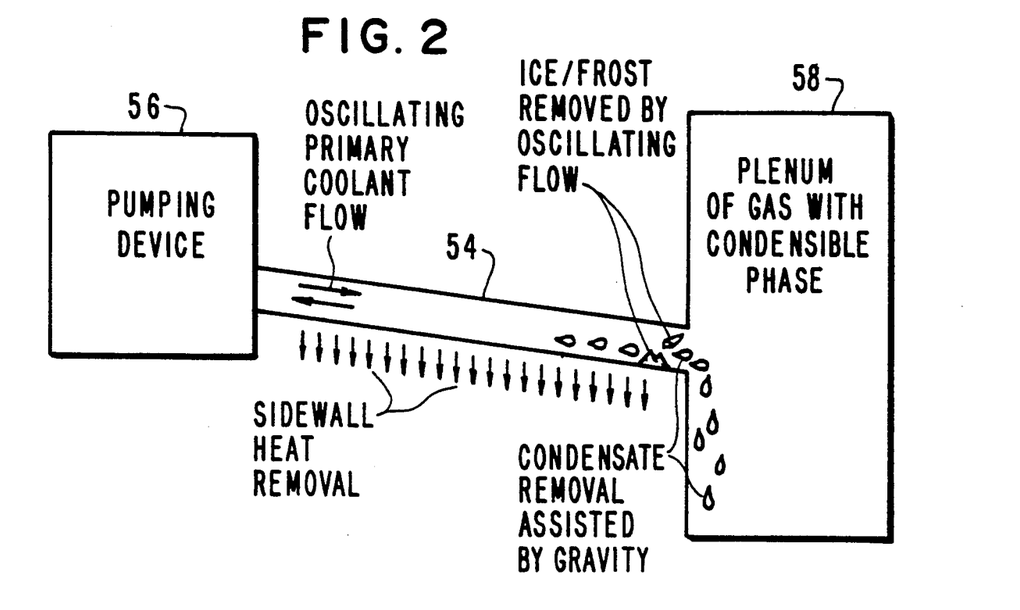
FIG. 2 is a schematic view of a second, preferred embodiment of the present invention.

Referring to FIG. 2, another embodiment is illustrated in which the conduit 54 has first and second ends, a pumping device 56 for creating an oscillating flow of primary coolant is connected to one end of the conduit 54 and a plenum 58 of gas with a condensable phase is connected to the other end. The pumping device 56 may be any one of the single action pumps described herein. The arrangement of FIG. 2 permits operation in a heat/condensate/frost removal mode. The primary coolant is connected to the plenum and heat is removed from the plenum fluid. Any frost which blocks the conduit 54 will be removed by the force of the oscillating coolant and gravity. This is because the conduit 54 is inclined towards the pumping device 56. Possible uses for the system illustrated in FIG. 2 include refrigerators, heat pumps and liquefiers which could be operated without the inefficiencies of the normal defrost cycle. The plenum 58, for example, could represent the interior of a refrigerator. Sidewall heat removal occurs by exposing the exterior of the conduit 54 to a secondary coolant.

Figure 5:
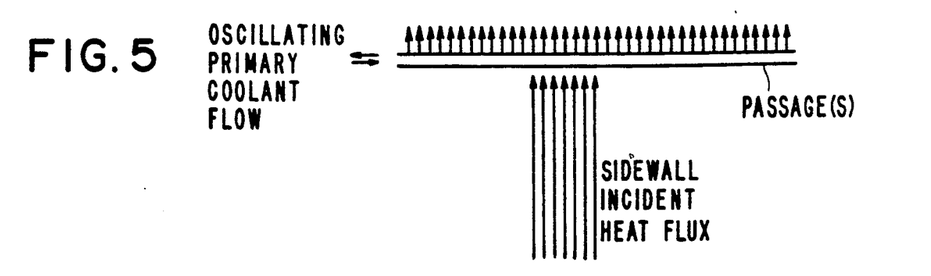
FIG. 5 is a schematic view illustrating the concept of heat transfer which results by the oscillating primary coolant flow according to the present invention.

FIG. 5 illustrates conceptually side wall heat removal, employed by various embodiments of the present invention which may be performed by a secondary coolant, radiation, or phase change material. Basically, the system acts as a heat transformer with a high incident heat flux through a side wall being transformed to a lower heat flux rejected through the side wall.

Figure 6:
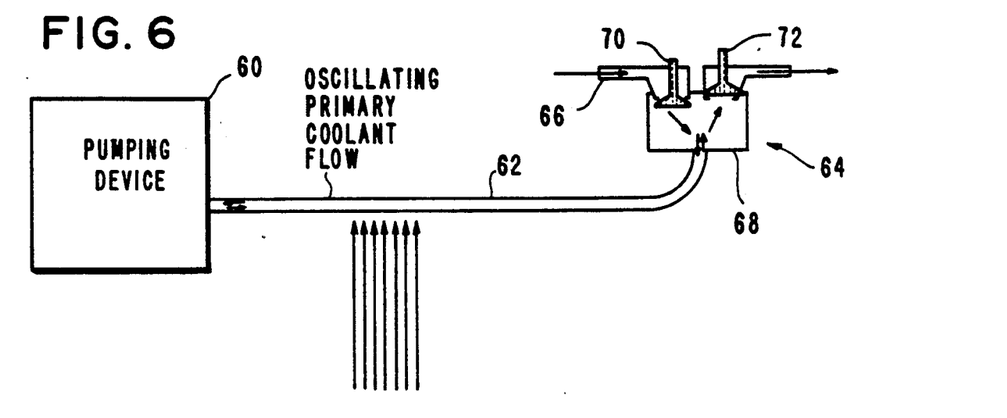
FIG. 6 is another embodiment of a heat exchange apparatus according to the present invention.

FIG. 6 illustrates another embodiment of the heat exchange apparatus of the present invention which includes a pumping device 60 which creates an oscillating flow of primary coolant in at least one conduit 62. The pumping device 60 is connected to one end of the conduit 62, while the other end of the conduit 62 is connected to a primary coolant removal device 64. In this case, a primary coolant supply line 66 is provided with the primary coolant which device includes a chamber 68 disposed in the primary coolant supply line 66. A pair of valves 70 and 72 are actuated sequentially so that in one half cycle of oscillation of the primary coolant in the conduit 62 one of the valves is open while the other is closed. Then, in the other half cycle, the open valve closes and the closed valve opens.

The result is that the side wall incident heat flux is transferred to the primary coolant, which then exits the system. Thus, a secondary coolant flow is not required, and the system is open. The valves in the coolant removal device may be reed valves which allow the device to be located remote from the pump, or may alternatively be mechanically operated by the pumping device.

Figure 7:
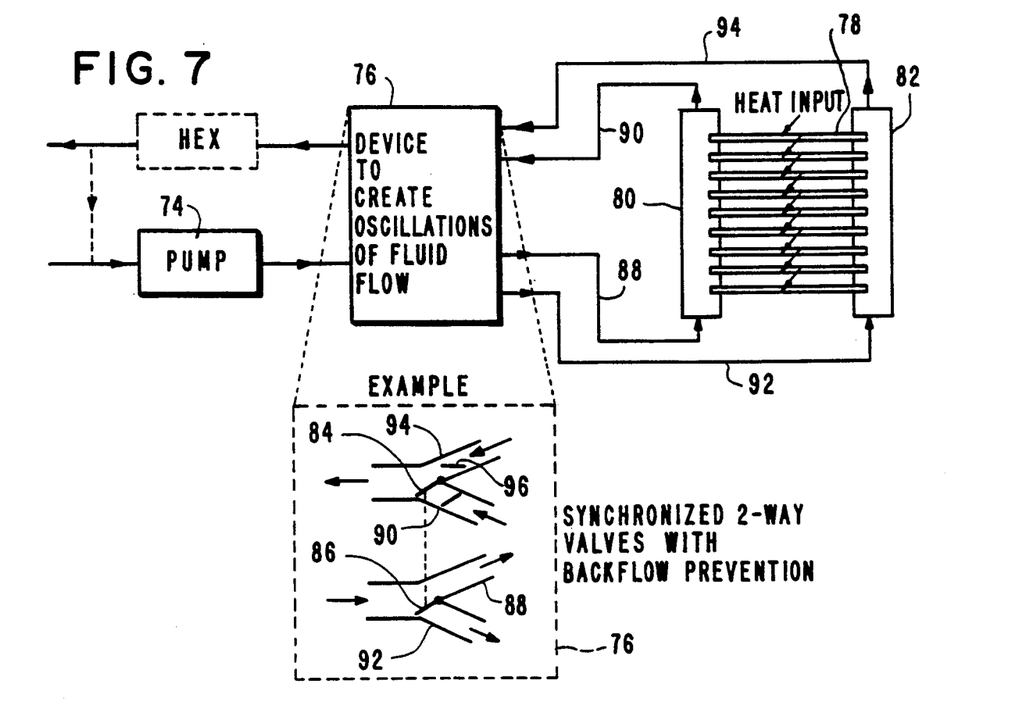
FIG. 7 is another embodiment of a heat exchange apparatus according to the present invention.

In the embodiment of FIG. 7, a system is illustrated in which the oscillating flow is created by a pump 74 which simply creates a pressure head in the system. The pump 74 is connected to a device 76 for creating oscillations of the fluid which flows in the various channels of the system. The heat flux is exposed to a plurality of conduits 78 which are arranged between two manifolds 80 and 82. The primary fluid is caused to oscillate back and forth through the conduits 78 by means of the device 76.

An example of the device is illustrated as a pair of synchronized two-way valves 84 and 86. When the pump 74 creates a pressure head, and when the valves are in the position illustrated in FIG. 7, the coolant flow is directed through channel 88 to the manifold 80. Since the channel 90 is blocked by the valve 84, flow is forced from left to right from manifold 80 to the manifold 82. Since the channel 92 is blocked by the valve 86, the flow is then forced through channel 94 and eventually back to the pump 74. When the order of the valves is switched, channel 88 is blocked and channel 92 is opened thereby creating a flow from right to left, or, from manifold 82 to manifold 80. Since the channel 94 is also blocked and since channel 90 is opened, the flow exits through the channel 90 and eventually back to the pump 74. The heat exchanger, HEX, is provided as an optional feature downstream of the device 76 if closed loop operation is desired.

Check valves 96 are provided at the two way valves 84 and 86 to prevent back flow. The two valves 84 and 86 are synchronized to create the oscillating flow through the conduits 78.

Another example of a device 76 to create oscillations of fluid flow could be created using standard fluidic circuits.

The advantage achieved by the use of oscillating flow in the various embodiments described above over heat pipes is that the present invention is not limited by the fluid-dynamic heat transport limits on capillary liquid pumping and vapor flow which limit heat pipe performance. In addition, the boiling limits on liquids in the various embodiments of the present invention is not as severe as in heat pipes because the heat pipes operate at their saturation temperature and hence the temperature drop through liquid in the wick of a heat pipe represents superheating which can cause boiling. The fluid temperature of fluids used according to the present invention is not constrained to the saturation temperature, so that the selection of primary coolants for various operation conditions is increased greatly.

According to the present invention, the oscillating flow of primary coolant produces a velocity boundary layer with thickness proportional to the square root of the ratio of the kinematic viscosity to the circular frequency of the oscillation. At high frequencies, this flow becomes a nearly constant velocity flow in the crosswise direction (a "slug" flow) with thin velocity boundary layers at the walls of the coolant passages. The slugs of fluid in the center of the passages accept heat from the sidewalls through the velocity boundary layer by normal molecular conduction, convect down the channel to an area of lower heating, and release the heat to the sidewall (or the reservoir) before returning to start a new cycle. The result of this behavior is a very high effective streamwise thermal conductivity which allows the transfer of heat nearly isothermally as in a heat pipe. Thus, a feature of all embodiments of the present invention is that there is a net flux of heat through the conductive primary coolant passage walls somewhere in the device. Also, there is an oscillating flow of the primary coolant in the primary coolant passages with a displacement amplitude that can be as small as an acoustic disturbance to displacements far larger than the length of the coolant passages. The frequency of oscillation ranges between about 1 and 1,000 Hz, and preferably about 100 Hz.

Figure 8:
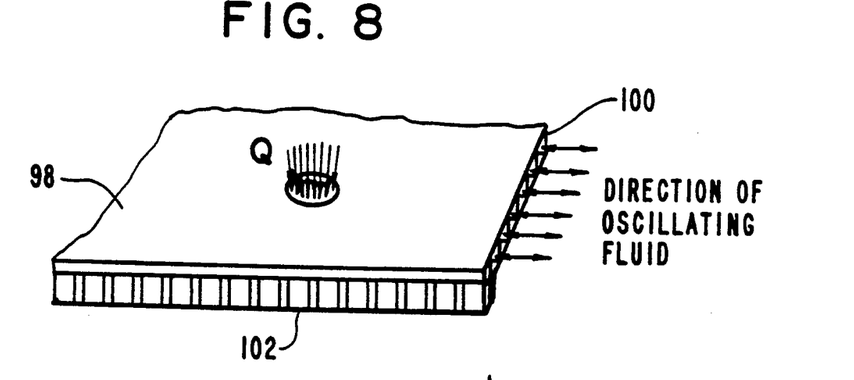
FIG. 8 is a schematic, perspective view showing a laser hardening technique employing a heat exchange apparatus according to the present invention.

FIG. 8 shows a particular application of the present invention in which the heat exchange apparatus is used for laser hardening of a space craft. The heat flux Q is indicated by the arrows which impinge upon a surface 98 to be hardened. A plurality of conduits 100 are provided under the surface as individual channels for oscillating fluid coolant. The coolant passages can be layered (if their diameters are small such as microchannels), and oriented and stacked in various directions to effectively spread heat in all directions. A high-capacity heat storage medium 102 is disposed under the conduits 100. The fluid passages or conduits 100 are small and formed close to the surface. Self-contained passive heat storage layers located adjacent to the fluid passages absorb the local heat pulse which is spread over a large area by the oscillating fluid. Possible heat storage mechanisms to make up the layer 102 include a honeycomb core filled with a phase change material.

Figure 9:
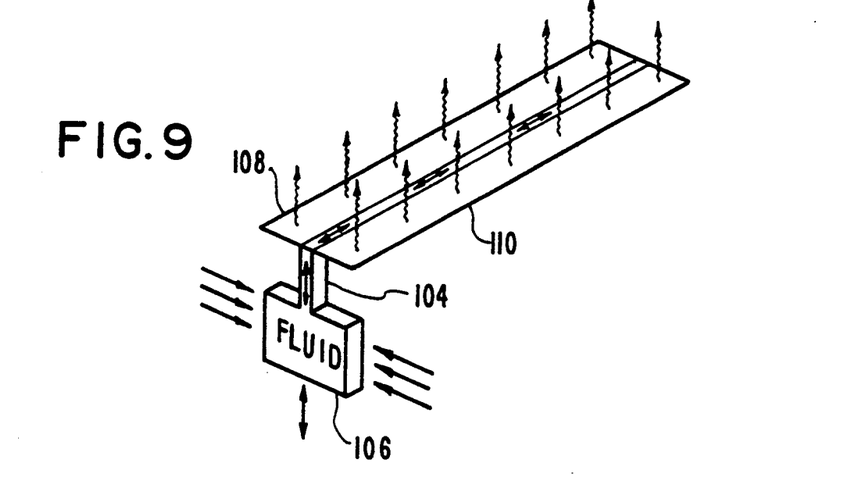
FIG. 9 is a schematic, perspective view of another heat exchange apparatus according to the present invention which can be used as an isothermal surface or as a radiator.

FIG. 9 illustrates another use of the present invention as a high capacity heat transport device enabling extended, isothermal surfaces or modular radiators. Generally, an elongated conduit 104, or a plurality of conduits, is coupled to a fluid reservoir 106 which is exposed to an incident heat flux. Fluid in the reservoir 106 is caused to flow in an oscillatory manner by any of the pumps previously described. Radiating fins 108 and 110 dissipate heat transferred to the fluid in the conduit over an extended length. This provides the ability to transport large quantities of the heat and reject it over very long distances at a very low rate. This type of device could replace a high-capacity heat pipe where maximum heat capacity is not governed by wicking, boiling, entrainment limits, etc.

Figure 10:
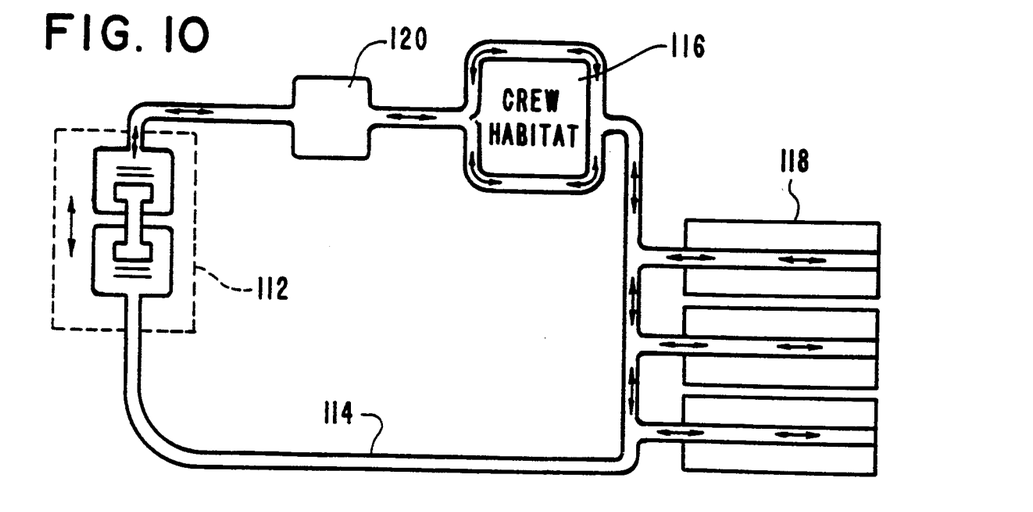
FIG. 10 is a schematic view of another embodiment of the heat exchange apparatus according to the present invention.

FIG. 10 represents another embodiment of the present invention in which a thermal bus is used for a space station. In the system, a pump 112, such as a double-piston reciprocating pump, imparts an oscillating flow of fluid in a bus line 114. The bus line encircles a crew habitat 116. A plurality of radiators 118, such as in FIG. 9, are also coupled to the bus 114 for dissipating heat transferred to the fluid coolant. Electronic cold plates 120 are also disposed in the bus to facilitate cooling thereof.

Figure 11:
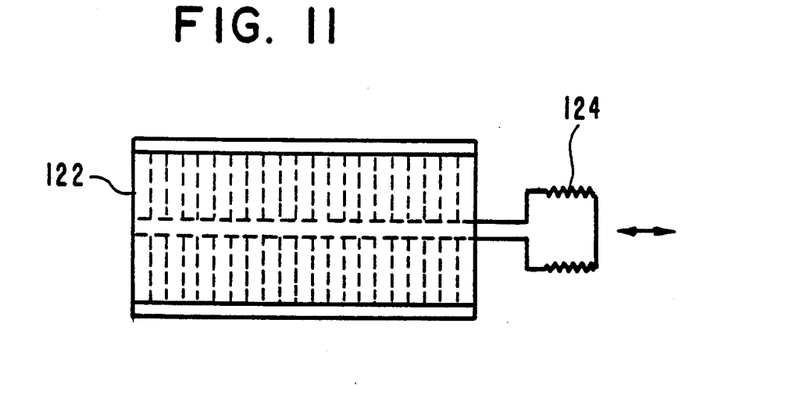
FIG. 11 is a top plan view of a radiator according to the present invention.

FIG. 11 illustrates an isothermal surface which utilizes the concept of the present invention. An oscillatory flow of primary coolant flows under a surface 122, which may for example be a radiator, grill or oven surface. Thus, a non-uniform incident heat flux upon the surface 122, and the structure, supplied with an oscillating flow of primary coolant through a coupling member 124, remains at a constant temperature.

Figure 12:
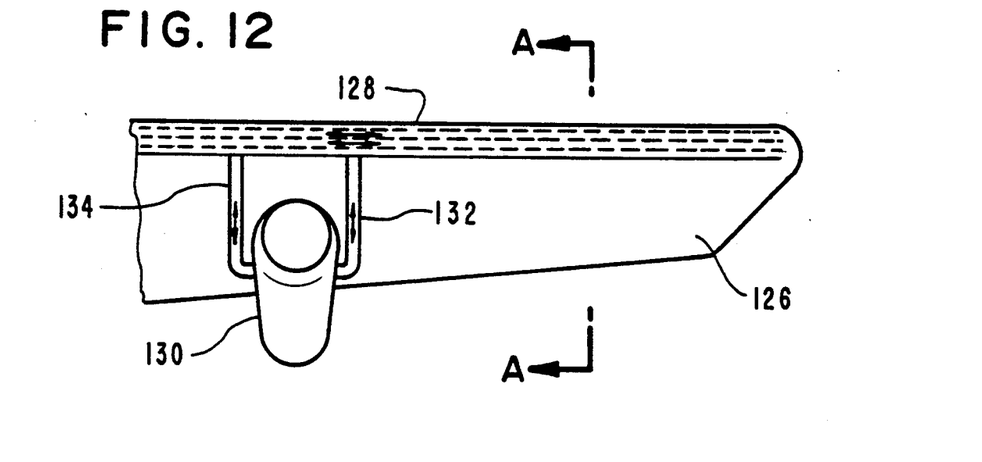
FIG. 12 is a schematic view of a wing de-icer employing a heat exchange apparatus according to the present invention.

FIG. 12 represents another use of the present invention as a de-icer for a wing leading edge. The wing 126 has a leading edge 128 which is provided with channels that extend span-wise. An engine 130 produces waste heat which is diverted to the oscillating flow channels through passages 132 and 134. These passages may be part of the engine mounting system.

Figure 13:
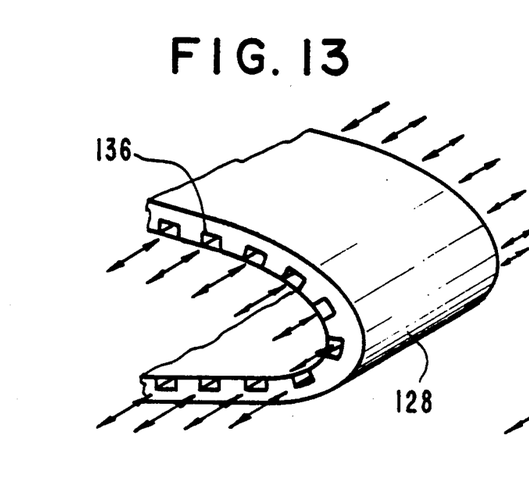
FIG. 13 is a sectional view taken along line A—A of FIG. 12.
Figure 14:
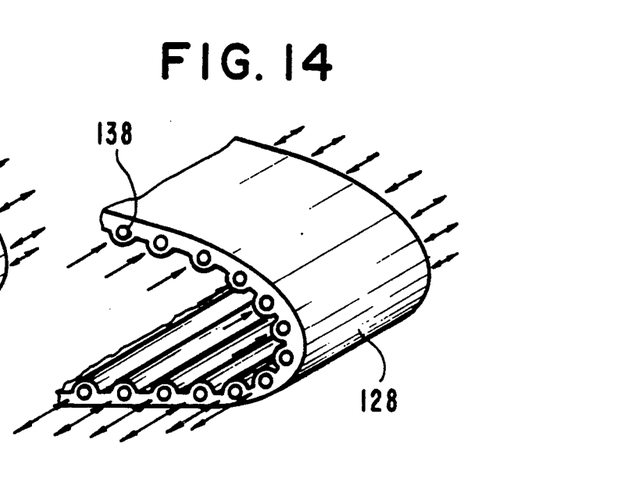
FIG. 14 is a sectional view taken along line A—A of FIG. 12 showing a variation of the embodiment of FIG. 13.

Two different embodiments of the flow channels are illustrated in FIGS. 13 and 14. FIG. 13 illustrates the channels 136 as rectangular and as being formed in the structural material which forms the leading edge 128 of the airfoil. These channels may be formed by etching.

In the embodiment of FIG. 14, the channels 138 are circular in cross-section and are formed in ridges which are integrally formed with the structural material which forms the leading edge 128.

Numerous modifications and adaptions of the heat exchange apparatus of the present invention will be apparent to those skilled in the art and thus, it is intended by the following claims to cover all such modifications and adaptions which fall within the true spirit and scope of the invention.

What is claimed is:

1. A heat exchange apparatus comprising:

at least one conduit having first and second ends and providing a primary coolant channel for a primary coolant, the at least one conduit being exposed to an incident heat flux; and means for imparting an oscillatory flow of primary coolant having sufficient frequency to establish a velocity boundary layer in the primary coolant at walls of the at least one conduit, wherein said imparting means imparts an oscillating flow of primary coolant to establish a boundary layer having a thickness which is proportional to the square root of the ratio of the kinematic viscosity to the circular frequency of oscillations of the primary coolant and establishes a nearly constant velocity slug flow of primary coolant in the cross-wise direction of the at least one conduit.

2. The heat exchange apparatus according to claim 1, wherein said imparting means imparts the oscillatory flow of primary coolant at the first conduit end and further comprising means for removing primary coolant at the second conduit end during one-half cycle of oscillation and for introducing primary coolant at the second conduit end during the other half-cycle.

3. The heat exchange apparatus according to claim 1, wherein said removing and introducing means comprises a chamber located at the second conduit end, an intake valve located in the chamber and connected to a primary coolant supply line, and an exhaust valve located in the chamber, wherein said intake and exhaust valves are actuated sequentially to coincide with half-cycles of oscillation of the oscillatory flow of primary coolant in the at least one conduit.

4. The heat exchange apparatus according to claim 1, wherein the at least one conduit comprises a fluid reservoir section exposed to an incident heat flux and an elongated conduit section fluidly connected thereto, and further comprising at least one radiating fin connected to the elongated conduit section to dissipate heat therefrom.

5. A heat exchange apparatus according to claim 1, wherein the at least one conduit comprises a plurality of tubes disposed side by side.

6. A heat exchange apparatus according to claim 5, wherein the plurality of tubes are bent to form an apex at which the incident heat flux is directed.

7. A heat exchange apparatus according to claim 6, wherein the apex of the plurality of tubes is disposed in a leading edge of an aerodynamic structure.

8. A heat exchange apparatus according to claim 1, wherein the at least one conduit comprises a plurality of channels formed in a sheet of structural material.

9. A heat exchange apparatus according to claim 8, wherein the sheet of structural material is layered, stacked and oriented in various directions.

10. A heat exchange apparatus according to claim 1, wherein the primary coolant is a liquid.

11. A heat exchange apparatus according to claim 1, wherein the means for imparting oscillating flow is an electromagnetic pump, the primary coolant is a liquid metal, and the at least one conduit is a closed loop.

12. A heat exchange apparatus according to claim 1, wherein the means for imparting oscillating flow is a fluidic oscillator.

13. The heat exchange apparatus according to claim 1, wherein said means for imparting an oscillatory flow comprises:

a pump for creating a pressure head in the primary coolant;

channel means for communicating primary coolant from the pump to the first end of the at least one conduit; and means disposed in the channel means for creating flow oscillations of the primary fluid, thereby imparting oscillating flow through the at least one conduit.

14. A heat exchange apparatus according to claim 13, wherein the means for creating flow oscillations is a pair of synchronized two way valves.

15. A heat exchange apparatus according to claim 13, wherein the means for creating flow oscillations is a fluidic oscillator.

16. A heat exchange apparatus according to claim 14, wherein said means for creating flow oscillation comprises a first manifold connecting the first end of the at least one conduit and a second manifold connecting the second end of the at least one conduit, a first channel connected to the first manifold, a second channel connected to the second manifold, a third channel also connected to the first manifold, and a fourth channel also connected to the second manifold, wherein one of the valves switches flow from either the first or second channels, and the other valve switches flow from either the third or fourth channels.

17. A heat exchange apparatus according to claim 16, wherein the first, second, third and fourth channels are provided with check valves to prevent back flow at the pair of two way valves.

18. A heat exchange apparatus comprising:

at least one conduit having first and second ends and providing a primary coolant channel for a primary coolant;

means for imparting an oscillatory flow of primary coolant from the first end of the at least one conduit such that the flow has sufficient frequency in the at least one conduit to establish a velocity boundary layer in the primary coolant at walls of the at least one conduit;

wherein said imparting means imparts an oscillating flow of primary coolant to establish a boundary layer having a thickness which is proportional to the square root of the ratio of the kinematic viscosity to the circular frequency of oscillations of the primary coolant and establishs a nearly constant velocity slug flow of primary coolant in the crosswise direction of the at least one conduit; and a plenum of gas with a condensable phase is connected to the second end of the at least one conduit, wherein the plenum is exposed to heat and heat is removed from plenum condensate-fluid by the primary coolant.

19. The heat exchange apparatus according to claim 18, wherein the at least one conduit is inclined toward said means for imparting the oscillatory flow.

20. The heat exchange apparatus according to claim 18, further comprising means for flowing a secondary coolant over an outer surface of the at least one conduit.

21. A heat exchange apparatus according to claim 18, wherein the at least one conduit is exposed to an external incident heat flux.

* * * * *